US009958277B1

(12) United States Patent
Espy et al.

(10) Patent No.: US 9,958,277 B1
(45) Date of Patent: May 1, 2018

(54) WAYPOINT-ASSISTED NAVIGATION OF AN ENTERPRISE FACILITY

(71) Applicant: EMC Corporation, Hopkinton, MA (US)

(72) Inventors: James Espy, Andover, MA (US); Patrick Weiler, Northborough, MA (US); Amnon Izhar, Brookline, MA (US); Steven Sardella, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 14/974,364

(22) Filed: Dec. 18, 2015

(51) Int. Cl.
*G01C 21/20* (2006.01)
*H04W 4/04* (2009.01)

(52) U.S. Cl.
CPC ............ *G01C 21/206* (2013.01); *H04W 4/04* (2013.01)

(58) Field of Classification Search
CPC ...... G01C 21/20; G01C 21/00; G01C 21/206; G01C 21/26; H04W 4/02; H04W 4/04; H04W 64/00; H04W 4/008; H04W 4/026; H04W 4/028; G01S 5/0242; H04M 1/72572
USPC .............. 701/409, 410, 434, 467, 469, 533; 705/7.21, 333; 709/206; 725/40; 455/67.11, 456.1, 456.6
See application file for complete search history.

(56) References Cited

U.S. PATENT DOCUMENTS

| 7,369,061 | B1* | 5/2008 | Sellers | ................... | B60Q 1/482 340/539.11 |
| 8,836,580 | B2 | 9/2014 | Mendelson | | |
| 8,930,134 | B2 | 1/2015 | Gu et al. | | |
| 2006/0053447 | A1* | 3/2006 | Krzyzanowski | .... | H04L 12/2816 725/40 |
| 2006/0247849 | A1* | 11/2006 | Mohsini | ............... | G01C 21/206 701/434 |
| 2007/0069923 | A1 | 3/2007 | Mendelson | | |

(Continued)

OTHER PUBLICATIONS

Eric Kim, "DeepBLE—Localized Navigation Using Low Energy Bluetooth," University of Pennsylvania School of Engineering and Applied Science, 2013-2014, 7 pages.

*Primary Examiner* — Anne M Antonucci
*Assistant Examiner* — Sanjeev Malhotra
(74) *Attorney, Agent, or Firm* — Ryan, Mason & Lewis, LLP (57) ABSTRACT

A method includes obtaining instructions at a mobile device comprising directions from a current location of the mobile device to a target location in a facility over a path identified by two or more waypoint devices distributed in the facility, receiving signaling over at least one wireless network from a selected one of the waypoint devices in the path, utilizing a radio frequency signal strength of the received signaling to estimate proximity between the mobile device and the selected waypoint device, presenting an indication of proximity to the first waypoint device via the mobile device based at least in part on the estimated proximity, determining whether the estimated proximity between the mobile device and the selected waypoint device is below a proximity threshold, and selecting another one of the waypoint devices in the path responsive to determining that the estimated proximity is below the proximity threshold.

20 Claims, 7 Drawing Sheets

(56) References Cited

U.S. PATENT DOCUMENTS

| | | | |
|---|---|---|---|
| 2007/0294032 A1* | 12/2007 | Zumsteg | G01C 21/12 701/469 |
| 2010/0070169 A1* | 3/2010 | Paulin | G01C 21/26 701/467 |
| 2010/0094536 A1* | 4/2010 | Lee | G01C 21/3611 701/533 |
| 2011/0222548 A1* | 9/2011 | Conway | H04L 1/0045 370/400 |
| 2012/0239319 A1* | 9/2012 | Singh | G01R 31/42 702/58 |
| 2014/0114560 A1* | 4/2014 | Jensen | G01C 21/3629 701/409 |
| 2014/0180572 A1* | 6/2014 | Acker, Jr. | G01C 21/00 701/410 |
| 2014/0195454 A1* | 7/2014 | Richie | G06Q 10/0833 705/333 |
| 2014/0304342 A1* | 10/2014 | Shekhar | G01S 5/0242 709/206 |
| 2015/0051994 A1 | 2/2015 | Ward et al. | |
| 2015/0126129 A1* | 5/2015 | Rangappagowda | H04W 24/06 455/67.11 |
| 2015/0133152 A1* | 5/2015 | Edge | G01S 5/0236 455/456.1 |
| 2015/0277931 A1* | 10/2015 | Staude | G06F 1/24 713/2 |
| 2016/0029158 A1* | 1/2016 | Hansen | G07C 1/24 455/456.1 |
| 2016/0086141 A1* | 3/2016 | Jayanthi | H04M 1/72572 705/7.21 |
| 2016/0127871 A1* | 5/2016 | Smith | H04W 4/025 455/456.6 |

\* cited by examiner

WAYPOINT-ASSISTED NAVIGATION OF AN ENTERPRISE FACILITY

FIELD

The field relates generally to navigation, and more particularly to navigating a facility.

BACKGROUND

Enterprise facilities may be very large and difficult to navigate. For example, datacenters are one type of enterprise facility and such facilities are rapidly growing in number and physical size. This rapid growth is based on a number of factors, including by way of example the adoption of hyperscalable cloud computing, increased use of mobile devices, network function virtualization, and connected Internet of Things (IoT). An individual site of a datacenter may include tens of thousands of servers, petabytes of storage, and various equipment for high performance networks. Datacenters may incorporate numerous cabinets containing various computing, networking and storage hardware. A cabinet layout of a typical large datacenter can appear to be an endless set of rows and aisles. As such, locating particular cabinets within the datacenter for servicing and other tasks can be error-prone and time consuming.

SUMMARY

Illustrative embodiments of the present invention provide techniques for efficient navigation of an enterprise facility.

In one embodiment, a method comprises obtaining instructions at a mobile device from a control server, the instructions comprising directions from a current location of the mobile device to a target location in an enterprise facility over a path identified by two or more waypoint devices distributed in the enterprise facility, receiving signaling over at least one wireless network from a selected one of the two or more waypoint devices in the path, utilizing a radio frequency signal strength of the received signaling to estimate proximity between the mobile device and the selected waypoint device, presenting an indication of proximity to the first waypoint device via the mobile device, the indication of proximity being based at least in part on the estimated proximity, determining whether the estimated proximity between the mobile device and the selected waypoint device is below a proximity threshold, selecting another one of the two or more waypoint devices in the path responsive to determining that the estimated proximity is below the proximity threshold, and repeating the receiving, utilizing, presenting and determining for the other selected one of the waypoint devices in the path.

These and other illustrative embodiments include, without limitation, methods, apparatus, devices, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

As discussed above, enterprise facilities can be very large and difficult to navigate. Some embodiments provide techniques for efficiently navigating an enterprise facility utilizing low energy radio frequency (LE RF) proximity detection and mobile device detection and feedback indications. While various embodiments are described below in the context of an enterprise facility comprising a datacenter, embodiments are not limited solely to navigating a datacenter. Instead, the techniques described may be used for navigating various other types of enterprise facilities, including but not limited to navigating an office building with multiple rooms, cubicles, desks, etc.

As described above, individual datacenters are growing rapidly in number and physical size. In some instances, this is due to the adoption of hyper-scalable cloud computing, increasing use of mobile devices, network functional virtualization, and connected IoT.

As datacenters grow in size, it is more difficult and time consuming to locate particular hardware for servicing. Some embodiments provide techniques for easily locating datacenter cabinets with reasonable accuracy using a LE RF proximity detection scheme and mobile device detection and/or feedback indications. Such embodiments thus extend the datacenter intelligent infrastructure and enhance serviceability with the potential for reduced total cost of ownership (TCO).

Datacenters based on cloud infrastructure have been increasing in size to the point where individual sites can contain tens of thousands of servers, petabytes of storage, and various equipment for high performance networks. In some datacenters, such hardware is arranged in cabinets in a seemingly endless set of rows and aisles. The larger the datacenter, the more difficult it can be to locate particular hardware for upgrade or replacement service. Mistakes in locating cabinets to service can contribute to increased mean time to repair (MTTR) and service errors. Embodiments provide techniques that may be used to reliably and accurately locate cabinets to reduce MTTR and overall TCO.

Embodiments can quickly and efficiently locate datacenter cabinets without requiring the use of triangulation or extensive manual operations. Thus, some embodiments are well suited for certain indoor environments where global positioning system (GPS) and other types of triangulation-based navigation are difficult or impossible to use. Embodiments, as discussed above, can extend infrastructure intelligence, increase serviceability, and reduce TCO for trusted infrastructure.

Modern enterprise facilities, such as datacenters, suffer from a number of service-oriented issues. For example, datacenters are growing in number and in size to the extent that there can be a large number of rows and aisles in a single facility. Additionally, customers have come to expect near 100% up-time. While system-level availability and reliability has increased over the years, having such a large amount of hardware in a single location makes it likely that service actions will be needed and scheduled often, even daily.

Highly trained personnel are typically required to service datacenter hardware, thus increasing service costs and TCO. Simplifying and increasing confidence of service action success can reduce costs by shortening MTTR and providing an environment suitable for less-trained, customer-based serviceability.

Locating datacenter cabinets using a manually-generated paper floorplan and manually-positioned location cards is possible but error-prone and could quickly get out of date with hardware changes and re-arrangement. For example, some datacenters utilize "hot" and "cold" aisle arrangements where a "cold" aisle is an aisle in which the fronts of cabinets face each other and draw cold air in to cool hardware equipment while a "hot" aisle is an aisle in which the back of cabinets face one another. In such an arrangement, a cabinet location indicator may be on a cold aisle side while servicing is to be performed on a hot aisle side. Thus, even with correct manual positioning of location cards there may be increased MTTR and TCO.

Keeping track of which cabinet is being serviced once an operator or service technician goes behind a cabinet can also be difficult. Triangulation may be utilized, but it has various complications. For example, GPS signals may not be available inside datacenters. Specialized devices may be installed permitting triangulation, but such devices may emit less desirable levels of RF energy relative to the LE RF used in some embodiments.

Some embodiments overcome one or more of the above-noted issues through the use of a system utilizing LE RF proximity detection, mobile devices such as smartphones, tablets or laptops with related applications, and an automated service procedure providing instructions and possibly confirming feedback. Confirming feedback can provide an extra level of confidence and reliability in navigating to a target location in an enterprise facility such as a particular cabinet in a datacenter.

Figure 1:
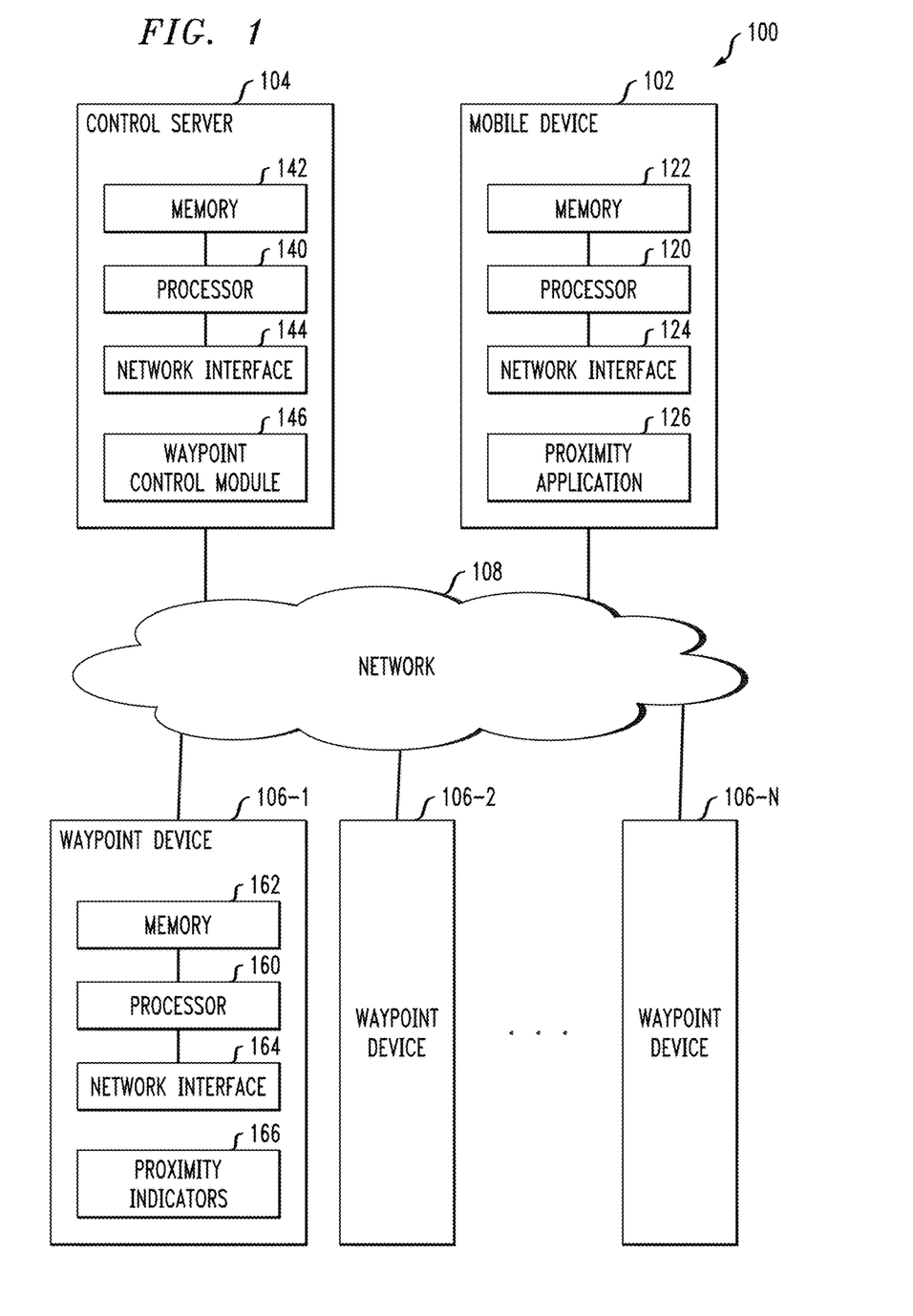
FIG. 1 is a block diagram of an information processing system for waypoint-assisted navigation of an enterprise facility in an illustrative embodiment of the invention.

FIG. 1 shows a system 100 including a mobile device 102, a control server 104 and a plurality of waypoint devices 106-1, 106-2, . . . 106-N collectively referred to herein as waypoint devices 106. The mobile device 102, control server 104 and waypoint devices 106 are coupled to network 108.

The mobile device 102 may comprise, for example, a mobile telephone, laptop computer or other type of device that a user can carry and move around a facility. Such devices are examples of what are more generally referred to herein as "processing devices." Some of these processing devices are also generally referred to herein as "computers."

The mobile device 102 in some embodiments is a device that is associated with a user of a particular company, organization or other enterprise. For example, the mobile device 102 may be associated with a service technician responsible for performing maintenance and/or service for an enterprise datacenter. The control server 104 and waypoint devices 106 may be associated with the same enterprise as the user of the mobile device 102, or a different enterprise. For example, one company may own or operate a datacenter including the control server 104 and waypoint devices 106, while servicing of the datacenter is outsourced to a different company. Numerous other operating scenarios involving a wide variety of different types and arrangements are possible, as will be appreciated by those skilled in the art.

The network 108 is assumed to comprise a wireless network, such as a LE RF network permitting communication between the mobile device 102 and the waypoint devices 106. The LE RF network may be a Bluetooth low energy (BT-LE) network or equivalent. In some embodiments, the control server 104 also communicates with the mobile device 102 and/or the waypoint devices 106 via the LE RF network. In other embodiments, however, the mobile device 102, control server 104 and waypoint devices 106 may communicate over one or more other types of networks. Thus, the network 108 shown in FIG. 1 may comprise one or multiple different types of networks, including a global computer network such as the Internet, a wide area network (WAN), a local area network (LAN), a satellite network, a telephone or cable network, a cellular network, a wireless network such as a WiFi or WiMAX network, or various portions or combinations of these and other types of networks. The network 108 in some embodiments therefore comprises combinations of multiple different types of networks each comprising processing devices configured to communicate using IP or other related communication protocols.

The mobile device 102, control server 104 and waypoint devices 106 in the FIG. 1 embodiment are assumed to be implemented using at least one processing device. Each such processing device generally comprises at least one processor and an associated memory, and implements one or more functional modules for controlling certain features of system 100 for waypoint-assisted navigation of an enterprise facility.

More particularly, the mobile device 102 in this embodiment comprises a processor 120 coupled to a memory 122 and a network interface 124. Similarly, the control server 104 comprises a processor 140 coupled to a memory 142 and a network interface 144 and waypoint device 106-1 comprises a processor 160 coupled to a memory 162 and a network interface 164. Although not explicitly shown in FIG. 1, other ones of the waypoint devices 106 may similarly comprise a processor coupled to a memory and a network interface.

Each of the processors 120, 140 and 160 illustratively comprises a microprocessor, a microcontroller, an application-specific integrated circuit (ASIC), a field-programmable gate array (FPGA) or other type of processing circuitry, as well as portions or combinations of such circuitry elements.

Each of the memories 122, 142 and 162 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interfaces 124, 144 and 164 allow the mobile device 102, control server 104 and waypoint device 106-1 to communicate over network 108 with one another, and illustratively comprise one or more conventional transceivers.

The processor 120 of the mobile device 102 implements a proximity application 126, while the processor 140 of the control server 104 implements a waypoint control module 146 and the processor 160 of the waypoint device 106-1 implements proximity indicators 166.

The proximity application 126 permits a user of the mobile device 102 to navigate an enterprise facility by sending and receiving signaling with the proximity indicators 166 of waypoint device 106-1 and proximity indicators of other ones of the waypoint devices 106. The waypoint control module 146 of control server 104 selectively activates signaling by respective ones of the waypoint devices 106, such that the mobile device 102 can navigate the enterprise facility utilizing a sequence of the waypoint devices 106. Additional details regarding the proximity application 126, waypoint control module 146 and proximity indicators 166 will be described in further detail below.

It is to be appreciated that this particular arrangement of the proximity application 126, waypoint control module 146 and proximity indicators 166 illustrated in the system 100 of the FIG. 1 embodiment is presented by way of example only, and alternative arrangements can be used in other embodiments. For example, in some embodiments the control server 104 itself may be a waypoint device, and thus in some embodiments a single processing device may implement functionality associated with both the waypoint control module 146 and the proximity indicators 166.

At least portions of the proximity application 126, waypoint control module 146 and proximity indicators 166 may be implemented at least in part in the form of software that is stored in one of the memories 122, 142 and 162 and executed by one of the processors 120, 140 and 160.

The mobile device 102, utilizing network interface 124, acts as a LE RF (e.g., BT-LE) receiving device relative to the waypoint device 106-1 acting as a unidirectional transmitter. The mobile device 102 runs proximity application 126, which process signaling received from a selected one of the waypoint devices 106 for proximity detection. In the example below, the selected waypoint device is assumed to be waypoint device 106-1. Proximity detection refers to a method for indicating geographic location closeness within a bounded space. The proximity application 126 is able to estimate proximity between the mobile device 102 and the waypoint device 106-1 using a radio frequency signal strength of the signaling received from waypoint device 106-1.

The proximity application 126 presents an indication of proximity to the waypoint device 106-1 via the mobile device 102. The indication, by way of example, may be a visual indication of proximity presented via a display of the mobile device 102. The visual indication may be, for example, an estimated numerical distance (e.g., a number of meters to waypoint device 106-1), a time to reach the waypoint device 106-1, an arrow indicating a direction of the waypoint device 106-1, a radar-like visual or heat map showing proximity between the mobile device 102 and the waypoint device 106-1, etc. The visual indication may also or alternatively include textual directions to the waypoint device 106-1, such as directions to go straight, turn left or right, backtrack, etc. Such textual instructions may be provided by control server 104, the waypoint device 106-1 or be determined by the proximity application 126 based on the estimated proximity. In other embodiments, the indication presented via the mobile device 102 need not be a visual indicator. For example, the indication may be presented audibly, by vibrating the mobile device 102, etc. In some embodiments, combinations of different types of indications are used, such as a combined audiovisual indication.

In some embodiments, only a single one of the waypoint devices 106 is activated at any given time. For example, the control server 104, via waypoint control module 146, may communicate with the proximity application 126 on mobile device 102 to identify a target location in an enterprise facility. The control server 104 can then selectively activate signaling by respective ones of the waypoint devices 106 in a sequence. In some embodiments the sequence of waypoint devices 106 is selected such that pairs of the waypoint devices 106 are within a line of sight of one another so as to provide incremental directions from a current location of the mobile device 102 to the target location in the enterprise facility. The control server 104 may further provide to the proximity application 126 one or more maps or diagrams of a layout of the enterprise facility, a set of directions or service instructions for display on the mobile device 102, etc.

The communication between the control server 104 and mobile device 102, and between the control server 104 and waypoint devices 106, need not necessarily be via a LE RF network. For example, the control server 104 and mobile device 102 may instead communicate over one or more other types of wireless networks, such as a cellular or WiFi network. The control server 104 may also be connected to one or more of the waypoint devices 106 via a wired network, or via a wireless network other than a LE RF network. As will be discussed in further detail below, in some embodiments the control server 104 itself acts as one of the waypoint devices 106.

Waypoint devices 106, such as waypoint device 106-1, activate signaling via proximity indicators 166 based on instructions from the control server 104, the mobile device 102 or another one of the waypoint devices 106. The proximity indicators 166 may include, by way of example a beacon transmitter or other hardware for broadcasting signaling to the mobile device 102. As discussed above, the mobile device 102 can utilize a received signal strength of this signaling so as to estimate proximity between the mobile device 102 and the waypoint device 106-1. When the mobile device 102 moves within a certain threshold proximity of the waypoint device 106-1, the proximity indicators 166 may signal the control server 104 to activate a next one of the waypoint devices 106 in a path from the current location of the mobile device 102 to the target location in the enterprise facility. In some embodiments, the proximity indicators 166 may signal the next waypoint device in the path directly rather than via the control server 104.

The proximity indicators 166, in some embodiments, may further include hardware providing a visual, audio or audiovisual indicator, which may be viewed by a user of mobile device 102 to assist in navigating the user of the mobile device 102 to the target location in the enterprise facility. The proximity indicators 166, for example, may be used as confirming indicators to signal to the user of the mobile device 102 that a selected waypoint has been reached. Visual indicators may include, by way of example, light emitting diode (LED) lights or another type of indicator light or other display. Audio indicators may include speakers for emitting sounds, etc. The output of such indicators may vary based on the detected proximity of the mobile device 102. For example, the proximity indicators 166 of waypoint device 106-1 may include different colored lights used to indicate how close the mobile device 102 is to the waypoint device 106-1. The proximity indicators 166 of waypoint device may alternatively adjust an intensity of a light or emitted sound, or the frequency of an emitted light or sound (e.g., blinking or pulsing a light or sound) so as to indicate how close the mobile device 102 is to the waypoint device 106-1.

Proximity detection techniques used in some embodiments utilize a LE RF unidirectional transmitter, such as a BT-LE transmitter, and a receiving device. In the system 100, the waypoint device 106-1 acts as the unidirectional transmitter and the mobile device 102 acts as the receiving device. Proximity detection is based on calibration of RF signal strength and distance to the transmitter. Signal strength measured by the mobile device 102 may be compared against calibrated values so as to determine proximity to the waypoint device 106-1 transmitting the signal. The signal strength, for example, will increase as mobile device 102 is brought closer to the waypoint device 106-1. The low energy nature of the transmission or other signaling from the waypoint device 106-1 minimizes any impact with other devices in the enterprise facility, such as the hardware in a datacenter. Although the waypoint device 106-1 acts a unidirectional transmitter for proximity detection, the waypoint device 106-1 may support bi-directional communication as well for sending and receiving information from the control server 104 and/or the mobile device 102. Such information may include, for example, a map of an enterprise facility, directions, signaling for other ones of the waypoint devices 106, target service instructions, etc.

Mobile device 102, via proximity application 126 and possibly one or more device application programming interfaces (APIs), provides an indication of proximity as described above. The proximity application 126 may also provide an indication of when the transmitter such as waypoint device 106-1 is within a threshold proximity, indicating that the mobile device 102 has reached its target location or should move to a next one of the waypoint devices 106 in a sequence so as to reach the target location.

Very high proximity accuracy is not a requirement. For example, in some embodiments proximity accuracy may be approximately 0.5 meters. In other embodiments, a higher or lower proximity accuracy threshold may be utilized.

In some embodiments, the signaling from the transmitter such as waypoint device 106-1 provides an encoded address scheme. The encoded address scheme may comprise, by way of example, a universally unique identifier (UUID) which identifies an enterprise facility, a major field identifying a first portion of an address in the enterprise facility and a minor field identifying a second portion of the address in the enterprise facility. By way of example, the iBeacon® protocol utilizes the format shown below in Table 1:

TABLE 1

| Field | Size | Description |
| --- | --- | --- |
| UUID | 16 bytes | Defined by an application developer to be specific for a particular application and deployment use case |
| Major | 2 bytes | Further specifies a particular iBeacon ® and use case, such as a sub-region within a larger region defined by the UUID |

TABLE 1-continued

| Field | Size | Description |
| --- | --- | --- |
| Minor | 2 bytes | Allows further subdivision of the region or use case by the application developer |

In an embodiment wherein the enterprise facility is a datacenter, the iBeacon® format may be defined such that the UUID field identifies the datacenter, the major field identifies a particular row or aisle in the datacenter, and the minor field identifies a specific cabinet in the row or aisle. In other embodiments, the UUID, major field and minor field may be altered based on the layout of the datacenter or other enterprise facility. As an example, the UUID may identify a particular floor in an office building, while the major field identifies a row, aisle or hallway of cubicles, offices or other rooms on the floor and the minor field identifies a particular cubicle, office or other room in the row, aisle or hallway.

Figure 2:
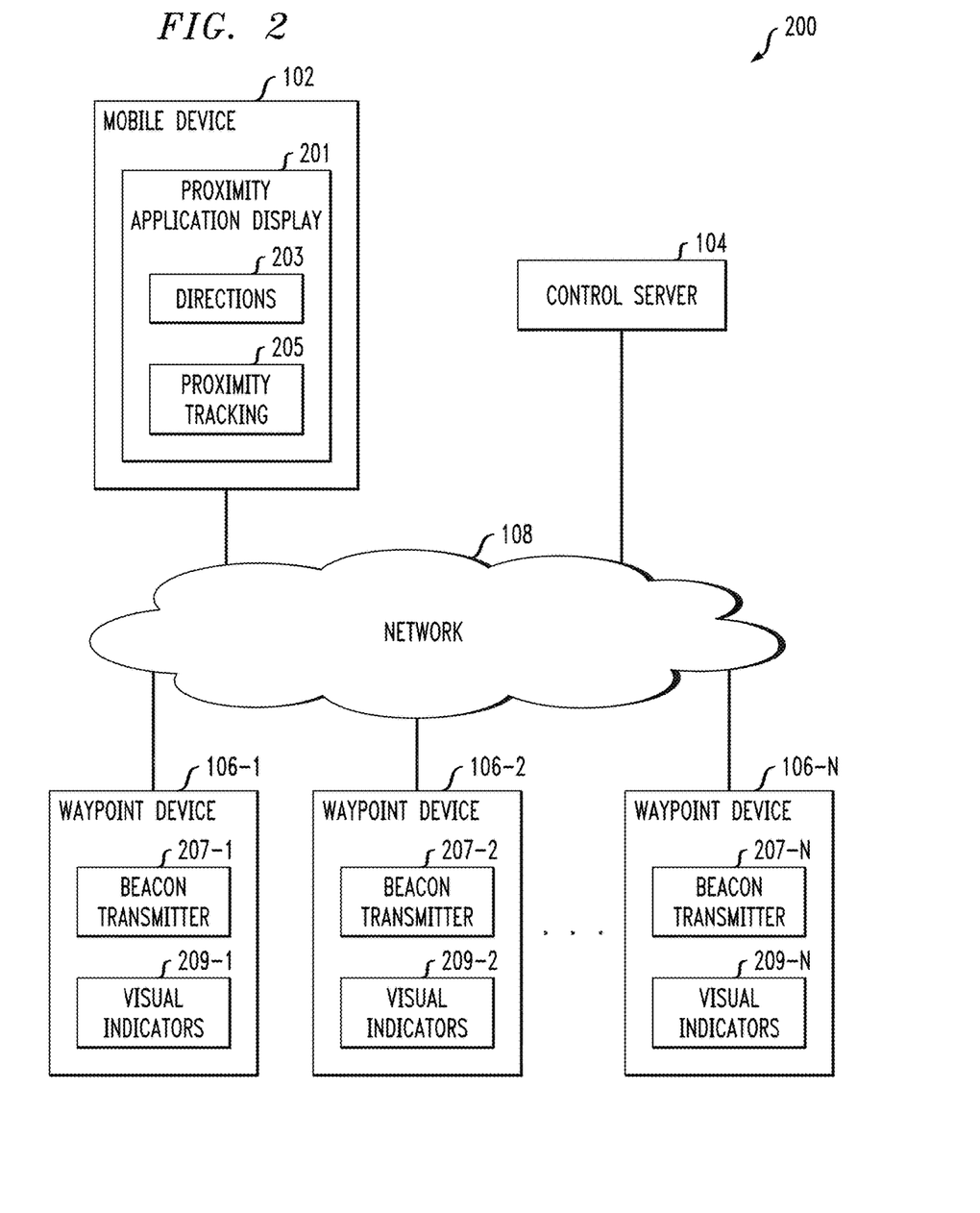
FIG. 2 shows another illustrative embodiment of an information processing system for waypoint-assisted navigation of an enterprise facility.

FIG. 2 shows another system 200 for waypoint-assisted navigation of an enterprise facility. System 200, similar to the system 100, includes mobile device 102, control server 104 and waypoint devices 106 connected via network 108.

In the system 200, the proximity application 126 running on mobile device 102 outputs a proximity application display 201 including directions 203 and proximity tracking 205. Although shown in FIG. 2 as including both directions 203 and proximity tracking 205, embodiments are not limited to this arrangement. In other embodiments the proximity application 126 running on mobile device 102 may output a proximity application display 201, which includes only one of directions 203 and proximity tracking 205, or both directions 203 and proximity tracking 205 plus additional information. Examples of the directions 203 and proximity tracking 205 output on the proximity application display 201 will be described in further detail below in conjunction with FIGS. 3-5.

The waypoint devices 106 in FIG. 2 are shown as including respective beacon transmitters 207 and visual indicators 209. The beacon transmitters 207 and visual indicators 209 are an example of the proximity indicators 166 described above.

A particular hardware implementation of the FIG. 2 system is described below. It is to be appreciated, however, that the particular hardware implementation described below is presented by way of example only, and that embodiments are not limited to use with the specific devices and network configuration listed below. The waypoint devices 106 and control server 104 of FIG. 2 may be implemented using lightweight computing devices such as a Raspberry Pi® devices. The beacon transmitters 207 may be iBeacon® transmitters connected to the lightweight computing devices via universal serial bus (USB) ports. The visual indicators 209 may be LED indicators also connected to the lightweight computing devices. The waypoint devices 106 and control server 104, implemented using respective Raspberry Pi® devices, may be connected to one another over network 108 via an Ethernet switch. The waypoint devices 106 may connect to the mobile device 102 over network 108 via a wireless LE RF network. The mobile device 102 may be implemented as a smartphone running an iBeacon® application suitably modified so as to implement the functionality described herein. In some embodiments, the control server 104 may itself also include beacon transmitters and visual indicators to act as a waypoint device.

It is to be understood that the particular set of elements shown in FIGS. 1 and 2 for navigation of an enterprise facility is presented by way of illustrative example only, and in other embodiments additional or alternative elements may be used. Thus, another embodiment may include additional or alternative systems, devices and other network entities, as well as different arrangements of modules and other components. As one example, the system 100 or 200 may include multiple mobile devices 102 that utilize waypoint devices to navigate to the same or different target locations in an enterprise facility.

An exemplary use case for waypoint-assisted navigation of a datacenter will be described in detail below with respect to FIGS. 3-5. It is to be appreciated, however, that embodiments are not limited solely to waypoint-assisted navigation of datacenters. Instead, embodiments may provide waypoint-assisted navigation of various other types of enterprise facilities as discussed above.

Figure 3:
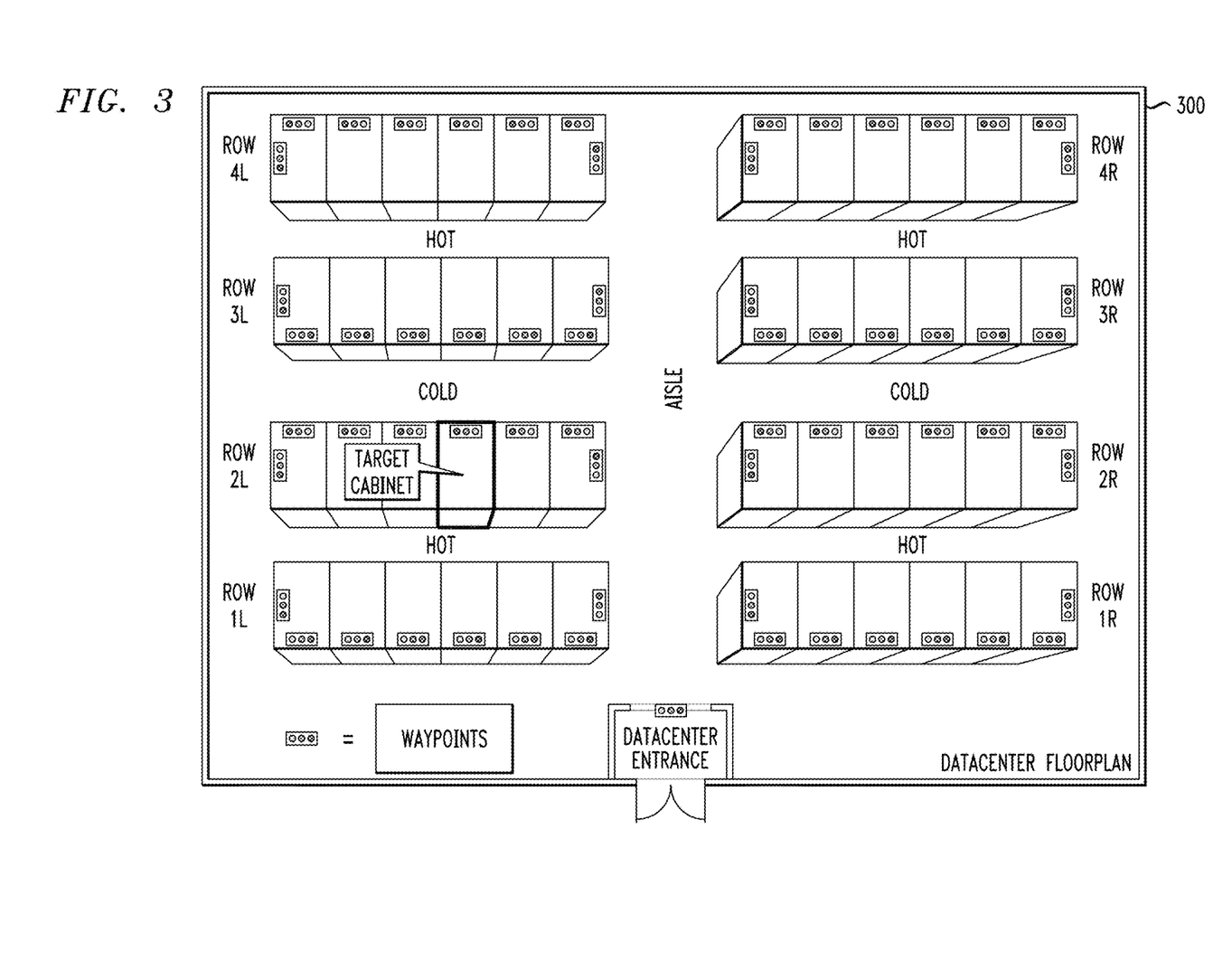
FIG. 3 shows an example of a datacenter floorplan including a plurality of waypoint devices in an illustrative embodiment.

FIG. 3 shows an example floorplan 300 for a datacenter, including one aisle and four rows of datacenter cabinets. The rows themselves are identified by an "L" or "R" to indicate whether they are left or right of the aisle, from the perspective of the datacenter entrance. For example, the floorplan 300 shows rows 1L, 2L, 3L, 4L, 1R, 2R, 3R and 4R. A plurality of waypoints, which may be implemented using the waypoint devices 106 as described above, are mounted at the datacenter entrance, on respective ones of the cabinets in each row, and at the ends of each row as shown.

Proximity detection takes advantage of the limited path choices along aisles and rows in the datacenter floorplan 300. The limited path choices along the aisles and rows can be utilized as a part of guiding mechanisms. Uniquely identified LE RF proximity transmitter waypoints, as shown in floorplan 300, are located on each cabinet, at the ends of rows and at the datacenter floor entrance point. The waypoints are interconnected with a central control server, such as control server 104 and a management network that provides service location and procedure control from a layout database. Such functions may be an extension of existing infrastructure intelligence systems such as RackHD™, commercially available from EMC Corporation of Hopkinton, Mass.

It is important to note that embodiments are not limited to the specific arrangement of waypoints shown in the floorplan 300. For example, in some embodiments waypoints may be placed only at one end of each row of datacenter cabinets, or at neither end of each row. In other embodiments, waypoints may be mounted on the walls or floors of an enterprise facility, rather than on particular datacenter cabinets. In addition, floorplan 300 shows waypoints mounted on the datacenter cabinets only in the "cold" rows, but embodiments are not so limited. In some embodiments waypoints may be mounted on the datacenter cabinets in both hot and cold rows, in only hot rows, etc. In other embodiments, a datacenter or other enterprise facility may not distinguish between hot and cold rows.

The floorplan 300 in FIG. 3 shows a target cabinet in row 2L. The target cabinet is an example of a target location in an enterprise facility. A sequence of the waypoints may be used to navigate a user from the datacenter entrance to the target cabinet, as will be described with respect to FIG. 4.

Figure 4:
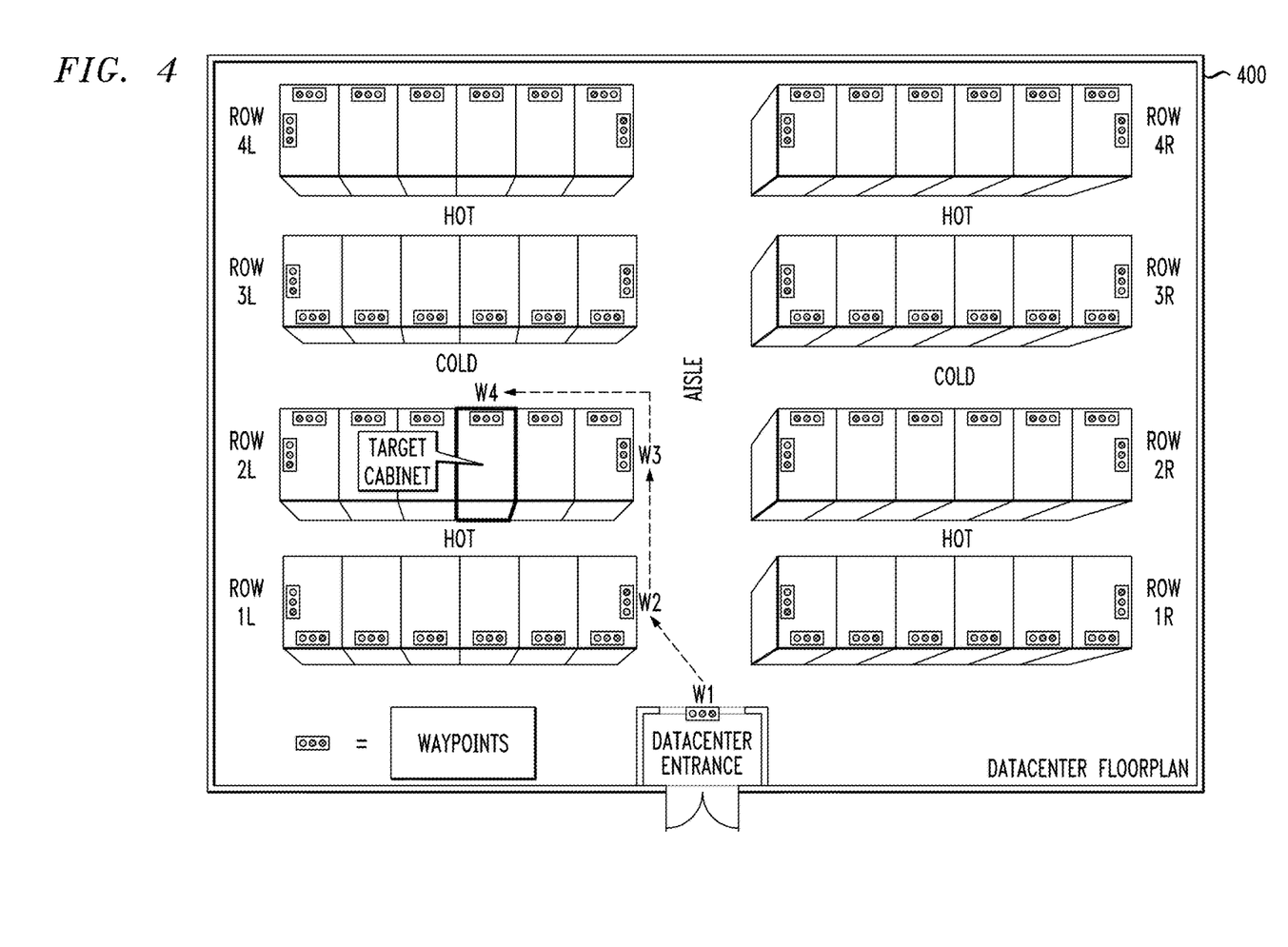
FIG. 4 shows an example of a path to a target cabinet in the datacenter floorplan of FIG. 3 in an illustrative embodiment.
Figure 5:
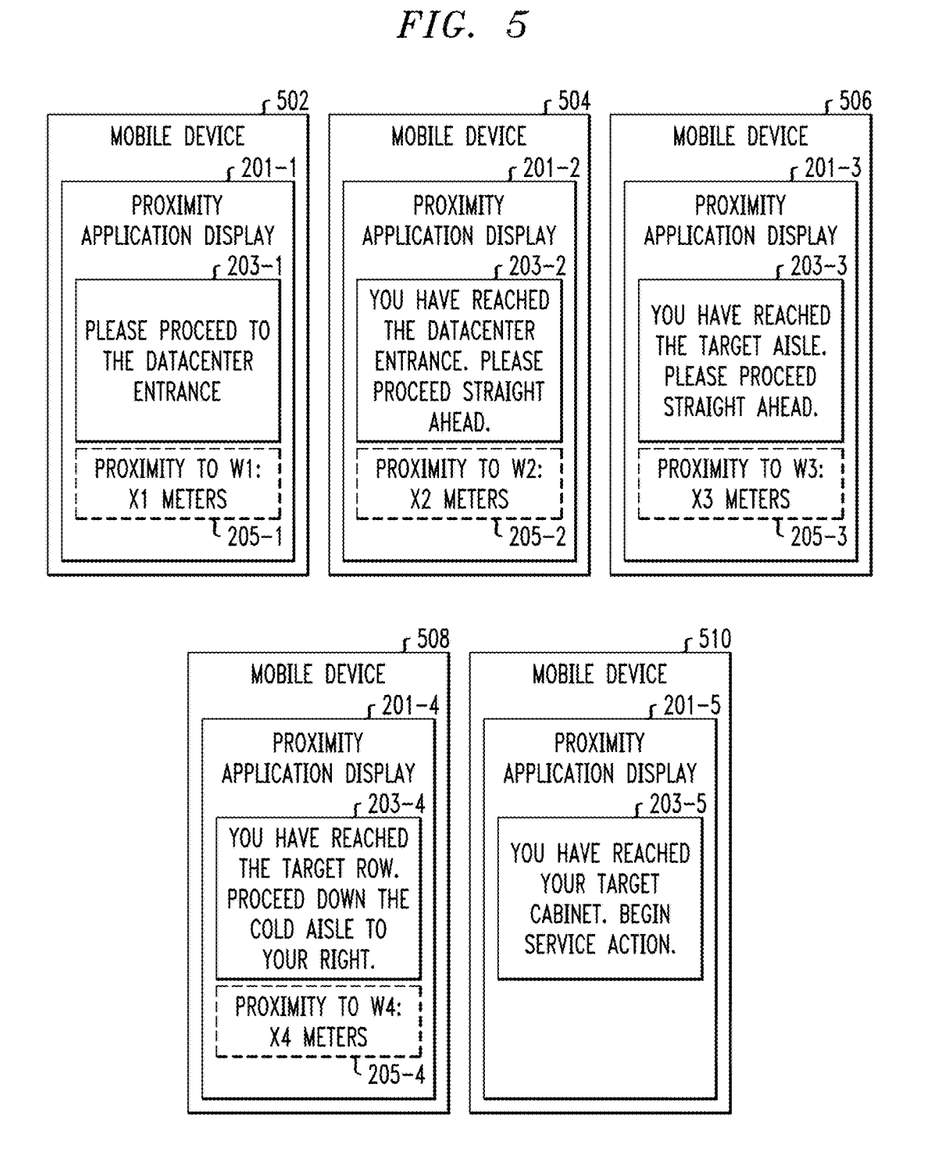
FIG. 5 shows examples of display outputs for a mobile device traversing the path to the target cabinet in an illustrative embodiment.

FIG. 4 shows a view 400 of the floorplan 300 indicating a path to be taken to navigate from the datacenter entrance to the target cabinet. The path in FIG. 4 includes waypoints denoted W1, W2, W3 and W4. The waypoint W1 is located at the datacenter entrance. The waypoints W2 and W3 are mounted at the ends of rows 1L and 2L, respectively, which face the aisle. Waypoint W4 is mounted on the target cabinet on the cold side of row 2L.

By activating selected waypoint transmitters in sequence, a service person can be guided to the target cabined by a series of line-of-sight waypoint proximity stops obviating the need for triangulation-based location mechanisms. In the FIG. 4 example, a service person with a mobile device such as mobile device 102 with proximity application 126 is first directed to the datacenter floor entry waypoint, W1. FIG. 5 shows the proximity application display 201 output by the proximity application 126 on mobile device 102 as the service person navigates the path to the target cabinet in the FIG. 4 example.

When the waypoint W1 is actively signaling, the screenshot 502 is shown, where the proximity application display 201-1 shows directions 203-1 directing the user to "Please proceed to the datacenter entrance." The proximity application display 201-1 may also show proximity tracking 205-1, which would continuously update as the mobile device 102 moves closer to the waypoint W1. Thus, the value "X1" shown in proximity tracking 205-1 would refresh periodically as the mobile device 102 moves closer (or farther) from the waypoint W1. The value of X1 may be estimated utilizing a received signal strength of the signaling or other transmission from waypoint W1. In other embodiments, the proximity tracking 205-1 may take other forms, such as the aforementioned radar screen or other visual indicator. In some embodiments, the proximity tracking 205-1 may be augmented or replaced with other types of indicators such as audio indicators as discussed above.

Upon arriving at the datacenter floor entry waypoint W1, the mobile device 102 may receive a confirming message, as well as new instructions and a direction pointer to the next waypoint, W2. The confirming message may be sent to the mobile device 102 from the waypoint W1, or may be relayed to the mobile device via control server 104. The determination as to when the waypoint W1 is reached may be based on various factors, and may be performed by the mobile device 102 using proximity application 126. For example, this determination may be based on information received at the waypoint W1 from the mobile device 102 itself, for example via an explicit message sent directly from the mobile device 102 to the waypoint W1 (or routed to the waypoint W1 via control server 104). In some embodiments, the waypoint W1 and the mobile device 102 may be NFC-enabled, and arrival may be signaled by tapping or otherwise pairing the mobile device 102 to the waypoint W1 via NFC.

After arrival at the waypoint W1, signaling by the waypoint W1 may be deactivated and signaling by the waypoint W2 may be activated. In other embodiments, the waypoint W1 may remain active even after arrival by the mobile device 102. By way of example, the waypoint W1 may remain active until a confirming message or indication is received as discussed below. On arrival at the waypoint W1, the mobile device 102 display is updated as shown in screenshot 504 where the proximity application display 201-2 displays new directions 203-2 "You have reached the datacenter entrance. Please proceed straight ahead." The directions 203-2 thus represent a confirming message that the user has reached the target waypoint W1, as well as instructions for proceeding to the next waypoint W2.

In other embodiments, the proximity application display 201-2 may differ. For example, on reaching the waypoint W1, the confirming message may be displayed until the user activates a user interface feature of the proximity application 126 causing the confirming message to be replaced with directions to the next waypoint. Various other examples are possible, including that the confirming message and directions to the next waypoint are presented in different portions of the proximity application display 201-2, or via different portions of the mobile device 102. For example, the confirming message need not be text-based. Instead, the confirming message may be signaled to the proximity application 126, which causes the mobile device 102 to vibrate or play a chime or other noise in addition to or in place of outputting a textual confirming message. The confirming message also does not have to be text-based but may instead cause display of an icon or other indicator of the mobile device 102.

The proximity application display 201-2 may also show new proximity tracking 205-2, which would continuously update as the mobile device 102 moves closer to the waypoint W2. Thus, the value "X2" shown in proximity tracking 205-2 would refresh periodically as the mobile device 102 moves closer (or further) from the waypoint W2. The value of X2 may be estimated by calibrating a received signal strength of the signaling or other transmission from waypoint W2.

Upon arrival at the waypoint W2, another confirming message may be sent to the mobile device 102 and the waypoint W2 may be deactivated while waypoint W3 is activated. The proximity application display 201-3 is updated to reflect new directions 203-3 and new proximity tracking 205-3 as shown in screenshot 506. Screenshot 506 shows the new directions 203-3 presented on proximity application display 201-3. Similar to the directions 201-2 in screenshot 504, the directions 201-3 represent a confirming message that the user has reached the target waypoint W2 ("You have reached the target aisle"), as well as instruction for proceeding to the next waypoint W3 ("Please proceed straight ahead"). The proximity tracking 205-3 continuously updates as the mobile device 102 moves closer to the waypoint W3. Thus, the value "X3" shown in proximity tracking 205-3 would refresh periodically as the mobile device 102 moves closer to or further from the waypoint W3. The value of X3 may be estimated utilizing a received signal strength of the signaling or other transmission from waypoint W3.

On reaching waypoint W3, the proximity application display 201-4 is updated to reflect new directions 203-4 and to new proximity tracking 205-4 as shown in screenshot 508. Screenshot 508 shows the new directions 203-4 presented on proximity application display 201-4. Similar to the directions 203-2 and 203-3 in screenshots 504 and 506, the directions 201-4 represent a confirming message that the user has reached the target waypoint W3 ("You have reached the target row"), as well as instruction for proceeding to the next waypoint W4 ("Please proceed down the cold aisle to your right"). The proximity tracking 205-4 continuously updates as the mobile device 102 moves closer to the waypoint W4. Thus, the value "X4" shown in proximity tracking 205-4 would refresh periodically as the mobile device 102 moves closer (or further) from the waypoint W4. The value of X4 may be estimated utilizing a received signal strength of the signaling or other transmission from waypoint W4. As discussed above with respect to screenshots 502, 504 and 506, in other embodiments the particular information displayed may differ and the confirmation message and directions to the next waypoint need not be displayed simultaneously. Also, upon arrival at the waypoint W3, the waypoint W3 may be deactivated while the waypoint W4 is activated.

On reaching waypoint W4, the proximity application display 201-5 is again updated as shown in screenshot 510. Screenshot 510 shows directions 203-5, which again includes a confirming message ("You have reached your target cabinet. Begin service action") As W4 is the waypoint for the target location, the screenshot 510 need not include proximity tracking. In other embodiments, however, proximity tracking may be shown. Again, the particular information displayed in directions 203-5 may vary in other embodiments. In some embodiments, the proximity application 126 may also download instructions for the particular service action needed, or provide a user interface feature allowing the user of the mobile device 102 to display such instructions.

The example described above with respect to FIGS. 3-5 illustrates a number of advantages. For example, the layout database does not need to have knowledge of the exact location of cabinets, just the cabinets that are in a particular row. Similarly, the layout database does not need to know the exact location of rows, just the rows that are along a particular aisle.

The use of BT-LE or other LE RF communications provides various advantages as well. For example, BT-LE or other LE RF communications may be used for both unidirectional proximity signaling as well as secure device communication between the mobile device 102, the control server 104 and the waypoint devices 106. BT-LE and other types of LE RF transmitters advantageously have low power requirements and may be low cost as well.

Another advantage is that the control server 104 may provide instructions to the target location in the enterprise facility via selective activation of respective ones of the waypoint devices 105 as well as downloading service or other instructions to the mobile device 102.

In some embodiments, as described above, the signaling from the waypoint devices 106 includes an encoded address scheme. The use of unique identifiers in the encoded address scheme allows for multiple service sessions to occur at the same time. For each service session, only one waypoint device needs to be active at any given time. Consider, by way of example, two service persons A and B at the same datacenter. Service persons A and B will receive waypoint-assisted navigation via respective first and second sequences of waypoint devices. The use of the unique identifiers allows the mobile devices of service persons A and B to follow the correct paths to their respective target locations. For each waypoint-assisted navigation, only one waypoint needs to be active at any given time. Of course, in some embodiments multiple waypoint devices on the same path may be active at the same time. For example, as mobile device 102 traces the path to the target waypoint W4 in the FIG. 4 example, multiple ones of the waypoint devices W1, W2, W3 and W4 may be active for at least some of the same time. As the user approaches waypoint W2, for example, the waypoint W3 may be activated before the waypoint W2 is deactivated.

Figure 6:
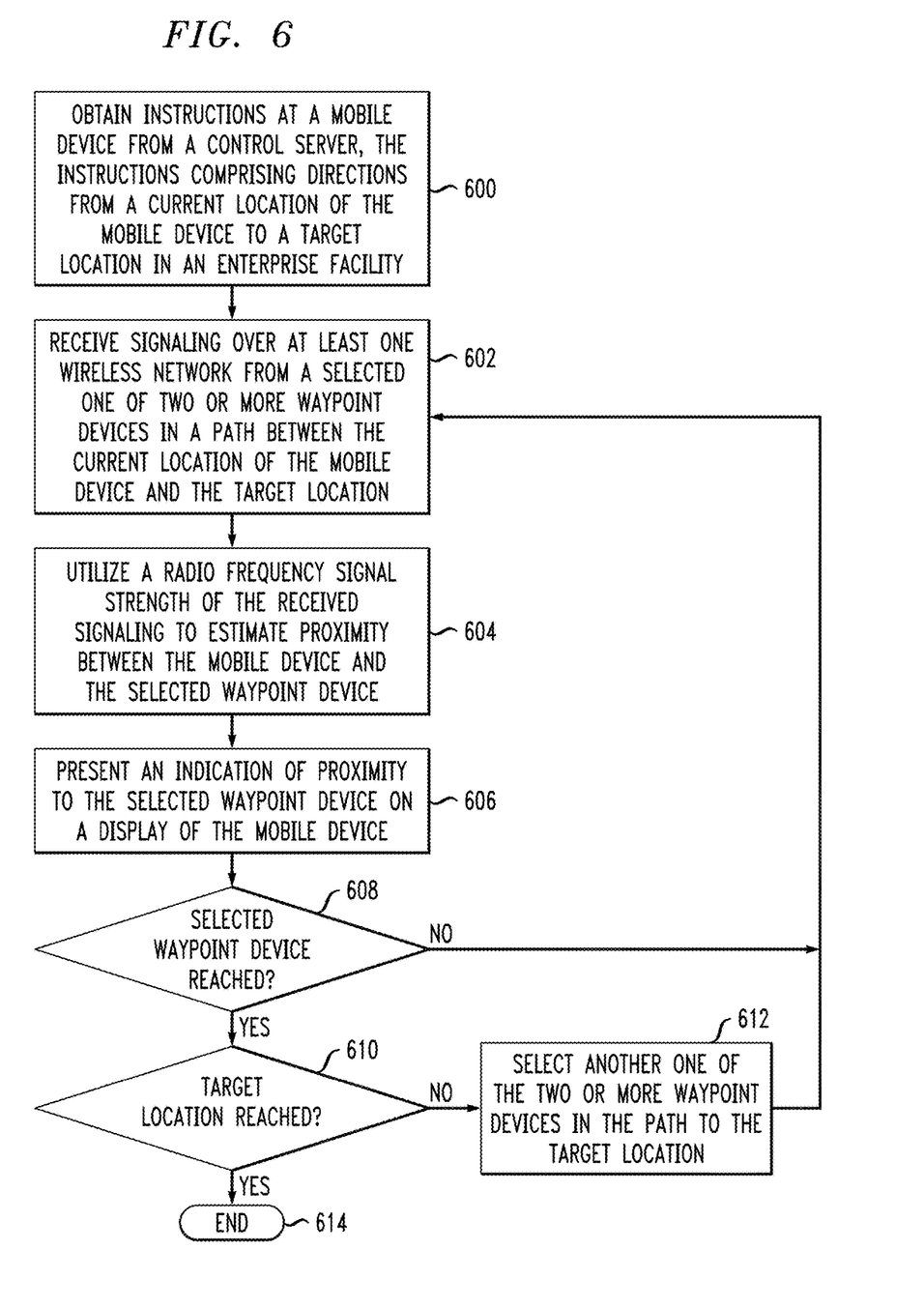
FIG. 6 is a flow diagram of an exemplary process implemented using the mobile device in the information processing system of FIG. 1 or FIG. 2.
Figure 7:
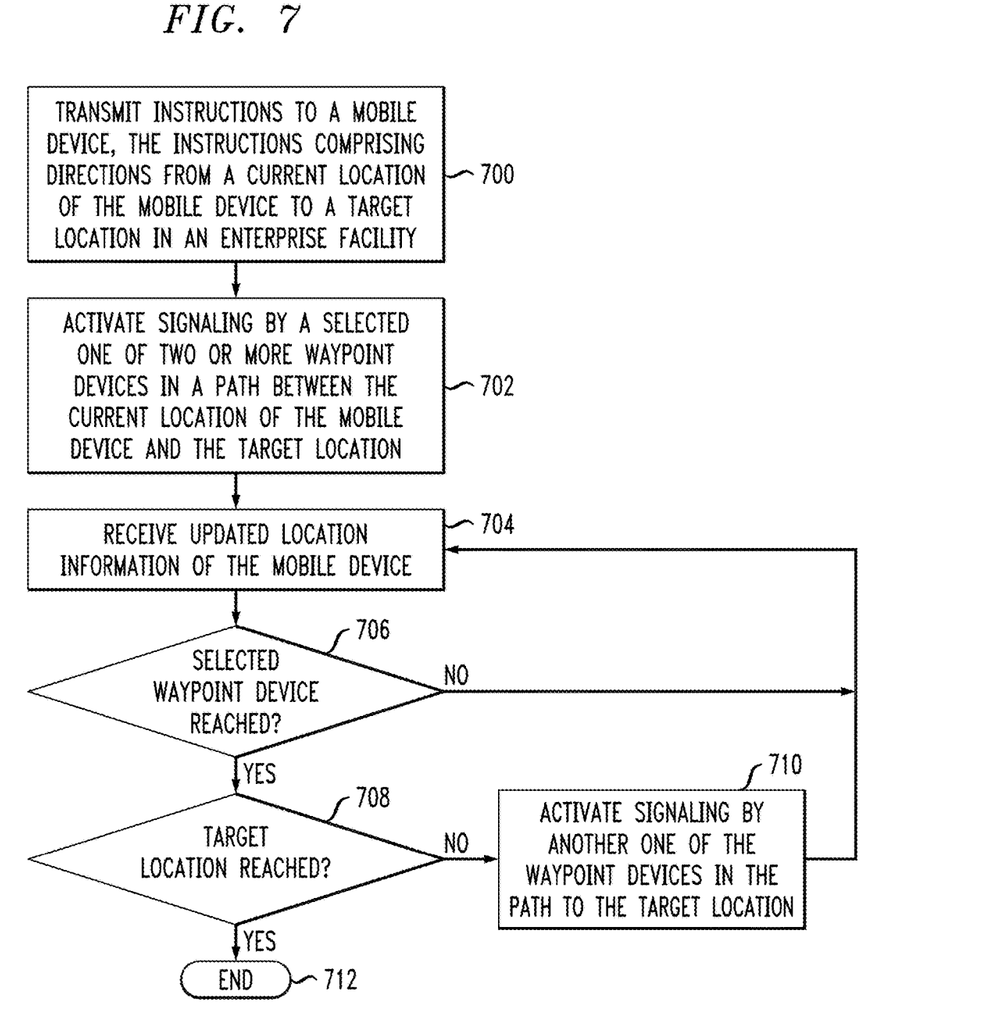
FIG. 7 is a flow diagram of an exemplary process implemented using the control server in the information processing system of FIG. 1 or FIG. 2.

An exemplary process for waypoint-assisted navigation of an enterprise facility will now be described in more detail with reference to the flow diagrams of FIGS. 6 and 7. FIG. 6 is a flow diagram for an exemplary process implemented using the mobile device 102, while FIG. 7 is a flow diagram for an exemplary process implemented using the control server 104. It is to be understood that the particular processes shown in FIGS. 6 and 7 are only examples, and that additional or alternative processes for waypoint-assisted navigation of an enterprise facility can be carried out in other embodiments.

The FIG. 6 process includes steps 600 through 614. In step 600, mobile device 102 obtains instructions from control server 104. The instructions comprise directions from a current location of the mobile device 102 to a target location in an enterprise facility. In some embodiments, the instructions obtained in step 600 include directions only to a next waypoint in a series of waypoints between the current location of mobile device 102 and the target location in the enterprise facility. Additional directions may be obtained by the mobile device 102 from control server 104, or one of the waypoints 106, on reaching each waypoint in the series of waypoints between the current location of the mobile device 102 and the target location in the enterprise facility.

In step 602, the mobile device 102 receives signaling over at least one wireless network from a selected one of two or more waypoint devices in a path between the current location of the mobile device 102 and the target location. The two or more waypoint devices in the path may include all or some subset of the waypoint devices 106. The at least one wireless network, as discussed above, may be a LE RF network such as a BT-LE network. In some embodiments, the waypoint devices 106 may signal over multiple different wireless network types, such as a BT-LE network and a WiFi network. The use of multiple different wireless network types may in some cases increase the accuracy of proximity estimation, but is not a requirement.

The mobile device 102 utilizes a radio frequency signal strength of the received signaling in step 604 to estimate proximity between the mobile device 102 and the selected waypoint device. An indication or proximity to the selected waypoint device is presented on a display of mobile device 102 in step 606.

In step 608, a determination is made as to whether the selected waypoint device is reached. Step 608 in some embodiments involves comparing the proximity estimated in step 604 with a threshold proximity value. For example, the result of decision step 608 may be yes when the estimated proximity in step 604 is less than or equal to a threshold proximity value such as 0.5 meters. In other embodiments, the threshold proximity value may vary. In some embodiments, the result of decision step 608 is not based on comparing the estimated proximity from step 604 with a threshold proximity value. For example, the mobile device 102 and the selected waypoint device may each be equipped with NFC interfaces, and the decision step 608 may result in yes if the mobile device 102 and the selected waypoint device are close enough to pair via NFC. In another example, the received radio frequency signal strength from step 604 may be compared to a threshold radio frequency signal strength in decision step 608 as an alternative to comparing the estimated proximity with the threshold proximity value. Various other techniques may be used in the decision step 608, including combinations of the above described techniques.

If the result of decision step 608 is no, the process loops back and again performs steps 602 through 606. Thus, the processing in steps 602 through 606 may be considered as being performed continuously until decision step 608 results in yes. When the result of decision step 608 is yes, a determination is made in step 610 as to whether the target location has been reached. If the result of decision step 608 is no, another one of the two or more waypoint devices in the path to the target location is selected in step 612 and steps 602 through 610 are repeated. When the result of decision step 610 is yes, then the mobile device 102 has reached the target location and the process ends in step 614. In some embodiments explicit confirmation indicators or messages may be sent to or presented by the mobile device on reaching a selected waypoint or the target location. The confirming messages or indicators may be textual messages such as those described above with respect to FIG. 5. In other embodiments, the confirming indicators may be other types such as audio indicators. Further, in some embodiments a confirming indicator may be provided by the selected waypoint device rather than by the mobile device.

In some embodiments, a user of mobile device 102 may have multiple target locations in the enterprise facility. For example, the user may be a service technician responsible for serving two or more different cabinets in a datacenter. In such cases, the FIG. 6 process may be repeated for each of the target locations by replacing step 614 with selecting a next target location in the enterprise facility and then repeating steps 600 through 614.

The FIG. 7 process includes steps 700 through 712. In step 700, control server 104 transmits instructions to mobile device 102. The instructions comprise directions from a current location of the mobile device 102 to a target location in an enterprise facility. In some embodiments, the instructions transmitted in step 700 include directions only to a next waypoint in a series of waypoints between the current location of mobile device 102 and the target location in the enterprise facility. Additional directions may be obtained by the mobile device 102 from control server 104, or one of the waypoints 106, on reaching each waypoint in the series of waypoints between the current location of the mobile device 102 and the target location in the enterprise facility.

In step 702, the control server 104 activates signaling by a selected one of two or more waypoint devices in a path between the current location of the mobile device 102 and the target location. The path may be considered a sequence of the waypoint devices. The control server 104 may activate such signaling by transmitting a notification or message to the selected waypoint device. This message may be transmitted to the selected waypoint device over a first network, where the signaling activated by the selected waypoint device utilizes a second, different network. For example, the control server 104 may be connected to the selected waypoint device over a wired network, whereas the signaling activated at the selected waypoint device utilizes a wireless network such as a LE RF wireless network. Various other arrangements are possible, including an arrangement wherein the first and second networks are the same, arrangements wherein the first and second networks are both wireless networks, etc.

The control server 104 receives updated location information of the mobile device 102 in step 704. The updated location information may be received at the control server 104 from the mobile device 102, from the selected waypoint device, or both. In some embodiments, step 704 need not be performed where the mobile device 102 navigates the sequence of waypoint devices without additional communication with the control server 104 after step 700. In step 706, a determination is made as to whether the selected waypoint device has been reached by the mobile device 102. If the result of decision step 706 is no, the process loops back to step 704. If the result of decision step 706 is yes, the process continues to step 708.

In step 708, a determination is made as to whether the mobile device 102 has reached its target location in the enterprise facility. If the result of decision step 708 is no, the control server 104 activates signaling by another one of the waypoint devices in the path to the target location in the datacenter in step 710, and steps 704 through 708 are repeated. If the result of decision step 708 is yes, then the process ends in step 712. In some embodiments, steps 704 through 710 may be performed by the selected waypoint device rather than by control server 104. In other embodiments certain steps in the FIG. 7 process, such as step 704, need not be performed at all.

As mentioned above, in some embodiments a user of mobile device 102 may have multiple target locations in the enterprise facility. For example, the user may be a service technician responsible for servicing two or more different cabinets in a datacenter. In such cases, the FIG. 7 process may be repeated for each of the target locations by replacing step 712 with selecting a next target location in the enterprise facility and then repeating steps 700 through 712.

As discussed above, the FIG. 6 and FIG. 7 processes are presented by way of example only, and various other processes may be used in other embodiments. For example, while the FIG. 7 process was described above as being performed by control server 104, in some embodiments the FIG. 7 process may be performed by one or more of the waypoint devices in the path between the current location of the mobile device 102 and the target location in the enterprise facility. Thus, various functionality described with respect to the control server 104 may be implemented by one or more of the waypoint devices 106.

Various embodiments provide a number of advantages relative to conventional techniques. For example, the use of LE RF for proximity detection with waypoint devices avoids the need for triangulation-based navigation or manual processes for navigation.

In some embodiments proximity may be determined based on threshold proximity values obviating a need for precise location determinations. As an example, in some embodiments getting within a meter or some other proximity threshold of a waypoint device is sufficient.

Waypoint devices may be augmented with visual indicators such as different colored lights to aid in proximity detection. A given waypoint device may have a red light and a green light, or a single light which can change between red and green output. The waypoint device may activate or display the red light until the mobile device 102 comes in range of the waypoint device, at which point the green light can be activated or displayed. There may also be an arrangement of lights like a traffic light, permitting colorblind users to still understand the distinction between the "red" and "green" indicator lights. Various other types of visual indicators may be used, such as illuminated arrows, light sequences, etc. Auditory indicators may also be used to aid in proximity detection. Unused waypoint devices may be turned off, such that only one waypoint device is activated at any given time. Alternatively, only those waypoint devices on the path to the target location may be active. The visual indicators of the waypoint devices on the path may be set or changed as the user navigates to the target location. In some embodiments the waypoint devices in the path may be line-of-sight stops on the path to the target location. As the user reaches each waypoint device in the path, that waypoint device can alter its visual indicators or turn off.

In some embodiments, different sets of waypoint devices may be activated to guide users of different mobile devices. The different sets of waypoint devices may use different visual indicators to distinguish from one another. For example, a first set of waypoints for a first path may use blue lights as visual indicators while a second set of waypoints for a second path may use yellow lights as visual indicators.

Some embodiments may also connect to or otherwise be incorporated with infrastructure hardware layer management mechanisms for facilitating automated location and guidance functionality. Such infrastructure hardware layer management mechanisms include management and orchestration layers such as RackHD™.

The use of mobile devices for waypoint-assisted navigation also provides various advantages for service functionality. Service functionality includes the use of and added value provided by user-friendly feedback features that may be implemented using the above-described proximity applications and the facilitation of location and service procedures such as "shopping cart" scheduled service methods. For example, in a scenario involving servicing a datacenter, the different cabinets or other hardware needing service may be added to a shopping cart. The control server 104 can then determine a sequence for servicing the items in the shopping cart and transmit appropriate instructions to service personnel via mobile devices.

A large datacenter, for example, may require servicing including multiple repair actions at different target locations such as different target cabinets in the datacenter. Waypoint-assisted navigation of such a datacenter can include multiple target cabinets in a selected order, with a shopping cart carrying repair units. Thus, some embodiments support sequential servicing wherein a serviceperson utilizes waypoint-assisted navigation to get to the first target cabinet, perform the necessary servicing, get to the second target cabinet, perform the necessary servicing, etc. The mobile device 102 of the serviceperson can be enhanced with service action instructions provided by control server 104 or one of the waypoint devices 106. Thus in some embodiments a serviceperson does not need prior knowledge as to where he or she needs to go, or even what service actions are needed at the different target cabinets. Waypoint-assisted navigation guides the serviceperson to the target cabinets, and the actual service instructions may be provided by a control server or waypoint device upon arrival at each target cabinet. Rich media services, including augmented reality, may be used to provide such instructions and service procedures.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of systems and processing device configurations. Also, different types and arrangements of, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   obtaining instructions at a mobile device from a control server, the instructions comprising directions from a current location of the mobile device to a target location in an enterprise facility over a path identified by two or more waypoint devices distributed in the enterprise facility;
   receiving signaling over at least one wireless network from a selected one of the two or more waypoint devices in the path;
   utilizing a radio frequency signal strength of the received signaling to estimate proximity between the mobile device and the selected waypoint device;
   presenting an indication of proximity to the first waypoint device via the mobile device, the indication of proximity being based at least in part on the estimated proximity;

determining whether the estimated proximity between the mobile device and the selected waypoint device is below a proximity threshold;

selecting another one of the two or more waypoint devices in the path responsive to determining that the estimated proximity is below the proximity threshold; and repeating the receiving, utilizing, presenting and determining for the other selected one of the waypoint devices in the path;

wherein signaling by two or more different ones of the waypoint devices at different locations in the enterprise facility is selectively activated in a sequence, the sequence being based at least in part on the path.

2. The method of claim 1 wherein said at least one wireless network comprises a low energy radio frequency network.

3. The method of claim 2 wherein the low energy radio frequency network comprises a Bluetooth low energy network.

4. The method of claim 1 wherein the target location comprises a target cabinet in a datacenter.

5. The method of claim 4 wherein the received signaling from each of the waypoint devices comprises an encoded address scheme, the encoded address scheme comprising:
  a universally unique identifier (UUID) identifying the datacenter;
  a major field identifying a given one of a plurality of rows of the datacenter; and
  a minor field identifying a given cabinet in the given row.

6. The method of claim 1 wherein identifying that the estimated proximity between the mobile device and the first waypoint device is below the proximity threshold comprises receiving a confirmation message, the confirmation message comprising instructions and a direction pointer to the second waypoint device.

7. The method of claim 1 wherein presenting the indication of proximity to the given waypoint device via the mobile device comprises presenting a visual indication of proximity to the given waypoint device on a display of the mobile device, the visual indication comprising:
  directions to the given waypoint device; and
  a proximity tracking graphic based on the estimated proximity.

8. The method of claim 1 wherein the two or more waypoint devices provide incremental line-of-sight proximity stops on the path between the current location of the mobile device and the target location in the enterprise facility.

9. The method of claim 1, wherein the signaling of the two or more different waypoint devices is selectively activated by transmitting a notification to a given waypoint device over a first network causing the given waypoint device to activate signaling over a second network different than the first network.

10. A computer program product comprising a non-transitory processor-readable storage medium having stored therein program code of one or more software programs, wherein the program code when executed by a mobile device causes the mobile device:
  to obtain instructions from a control server, the instructions comprising directions from a current location of the mobile device to a target location in an enterprise facility over a path identified by two or more waypoint devices distributed in the enterprise facility;
  to receive signaling over at least one wireless network from a selected one of the two or more waypoint devices in the path;
  to utilize a radio frequency signal strength of the received signaling to estimate proximity between the mobile device and the selected waypoint device;
  to present an indication of proximity to the first waypoint device via the mobile device, the indication of proximity being based at least in part on the estimated proximity;
  to determine whether the estimated proximity between the mobile device and the selected waypoint device is below a proximity threshold;
  to select another one of the two or more waypoint devices in the path responsive to determining that the estimated proximity is below the proximity threshold; and
  to repeat the receiving, utilizing, presenting and determining for the other selected one of the waypoint devices in the path;
  wherein signaling by two or more different ones of the waypoint devices at different locations in the enterprise facility is selectively activated in a sequence, the sequence being based at least in part on the path.

11. A mobile device comprising:
a memory;
a processor coupled to the memory; and
one or more network interfaces;
wherein the processor implements a proximity application configured:
  to obtain instructions at a mobile device from a control server, the instructions comprising directions from a current location of the mobile device to a target location in an enterprise facility over a path identified by two or more waypoint devices distributed in the enterprise facility;
  to receive signaling over at least one wireless network from a selected one of the two or more waypoint devices in the path;
  to utilize a radio frequency signal strength of the received signaling to estimate proximity between the mobile device and the selected waypoint device;
  to present an indication of proximity to the first waypoint device via the mobile device, the indication of proximity being based at least in part on the estimated proximity;
  to determine whether the estimated proximity between the mobile device and the selected waypoint device is below a proximity threshold;
  to select another one of the two or more waypoint devices in the path responsive to determining that the estimated proximity is below the proximity threshold; and
  to repeat the receiving, utilizing, presenting and determining for the other selected one of the waypoint devices in the path;
  wherein signaling by two or more different ones of the waypoint devices at different locations in the enterprise facility is selectively activated in a sequence, the sequence being based at least in part on the path.

12. The mobile device of claim 11 wherein said at least one wireless network comprises a low energy radio frequency network.

13. A method comprising:
transmitting instructions over at least one wireless network from a control server to a mobile device, the instructions comprising directions from a current location of the mobile device to a target location in an enterprise facility over a path identified by two or more waypoint devices distributed in the enterprise facility;

selectively activating signaling by respective ones of the two or more waypoint devices based on estimated location information of the mobile device;

wherein the signaling by a given one of the two or more waypoint devices permits estimation of proximity between the mobile device and the given waypoint device using a signal strength of the signaling received at the mobile device from the given waypoint device; and wherein selectively activating signaling by respective ones of the two or more waypoint devices comprises activating signaling by two or more different ones of the waypoint devices at different locations in the enterprise facility in a sequence, the sequence being based at least in part on the path.

14. The method of claim 13 wherein activating signaling by the two or more waypoint devices in the sequence comprises activating only one of the two or more waypoint devices at any given time.

15. The method of claim 13 wherein selectively activating the signaling by the two or more waypoint devices comprises causing respective ones of the two or more waypoint devices to broadcast an encoded address scheme, the encoded address scheme comprising:

a universally unique identifier (UUID) identifying the enterprise facility;
a major field identifying a given one of a plurality of rows of the enterprise facility; and
a minor field identifying a given location in the given row.

16. The method of claim 13 wherein selectively activating the signaling by the two or more waypoint devices comprises activating one or more visual indicators of respective ones of the two or more waypoint devices.

17. The method of claim 13 wherein the two or more waypoint devices provide incremental line-of-sight proximity stops on the path between the current location of the mobile device and the target location in the enterprise facility.

18. A computer program product comprising a non-transitory processor-readable storage medium having stored therein program code of one or more software programs, wherein the program code when executed by a control server causes the control server:

to transmit instructions over at least one wireless network to a mobile device, the instructions comprising directions from a current location of the mobile device to a target location in an enterprise facility over a path identified using two or more waypoint devices distributed in the enterprise facility; and to selectively activate signaling by respective ones of the two or more waypoint devices based on estimated location information of the mobile device;

wherein the signaling by respective ones of the two or more waypoint devices permits estimation of proximity between the mobile device and a given one of the two or more waypoint devices using a signal strength of the signaling received at the mobile device from the given waypoint; and wherein selectively activating signaling by respective ones of the two or more waypoint devices comprises activating signaling by two or more different ones of the waypoint devices at different locations in the enterprise facility in a sequence, the sequence being based at least in part on the path.

19. A control server comprising:

a memory;

a processor coupled to the memory; and one or more network interfaces;

the processor implementing a waypoint control module configured:

to transmit instructions over at least one wireless network to a mobile device, the instructions comprising directions from a current location of the mobile device to a target location in an enterprise facility over a path identified using two or more waypoint devices distributed in the enterprise facility; and to selectively activate signaling by respective ones of the two or more waypoint devices based on estimated location information of the mobile device;

wherein the signaling by respective ones of the two or more waypoint devices permits estimation of proximity between the mobile device and a given one of the two or more waypoint devices using a signal strength of the signaling received at the mobile device from the given waypoint; and wherein selectively activating signaling by respective ones of the two or more waypoint devices comprises activating signaling by two or more different ones of the waypoint devices at different locations in the enterprise facility in a sequence, the sequence being based at least in part on the path.

20. The control server of claim 19 wherein the control server comprises one of the two or more waypoint devices in the path between the current location of the mobile device and the target location in the enterprise facility.

* * * * *